G. JONES.
DRIVING ARRANGEMENT OF ELECTRIC MOTORS.
APPLICATION FILED DEC. 21, 1917.
1,313,537.
Patented Aug. 19, 1919
2 SHEETS—SHEET 1.
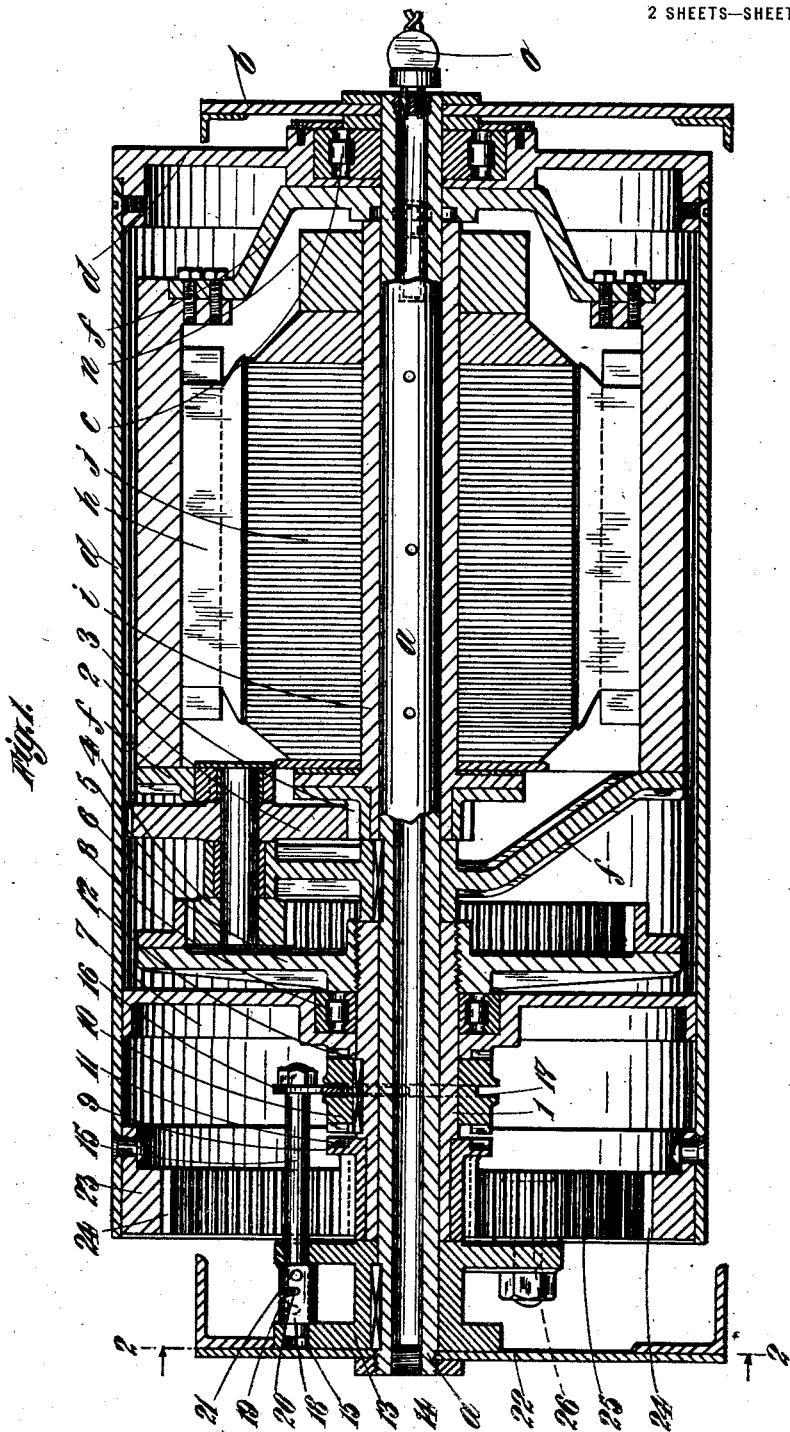
INVENTOR
GEORGE JONES
BY: 
ATTORNEY.

G. JONES.
DRIVING ARRANGEMENT OF ELECTRIC MOTORS.
APPLICATION FILED DEC. 21, 1917.
1,313,537.
Patented Aug. 19, 1919.
2 SHEETS—SHEET 2.
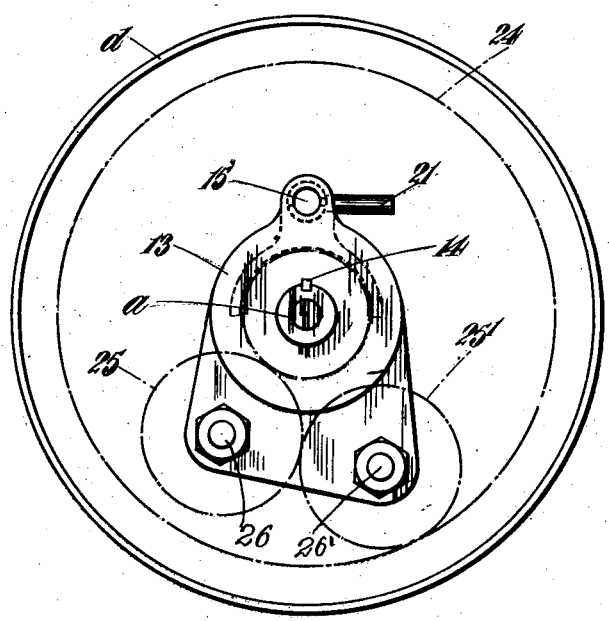
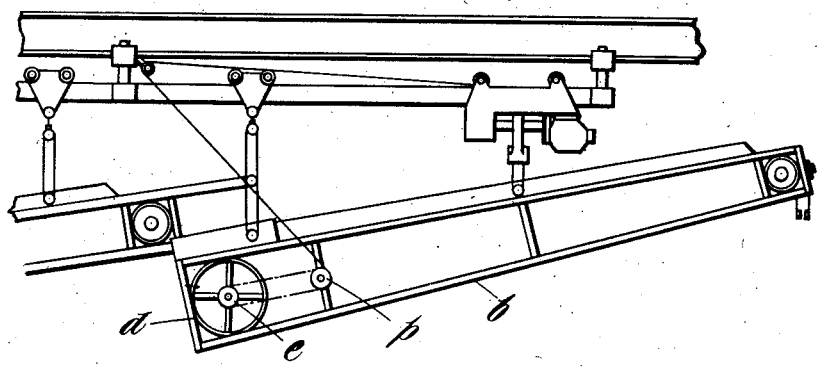
INVENTOR
GEORGE JONES
BY:
ATTORNEY.

UNITED STATES PATENT OFFICE.

GEORGE JONES, OF MANOR PARK, ENGLAND.

DRIVING ARRANGEMENT OF ELECTRIC MOTORS.

1,313,537.  Specification of Letters Patent.  Patented Aug. 19, 1919.

Application filed December 21, 1917. Serial No. 208,315.

*To all whom it may concern:*

Be it known that I, GEORGE JONES, a citizen of the United Kingdom of Great Britain and Ireland, and resident of 75 Whitta road, Manor Park, in the county of Essex, England, have invented certain new and useful Improvements in or Relating to Driving Arrangements of Electric Motors, of which the following is a specification, such as will enable others skilled in the art to which it appertains to make and use the same.

This invention relates to electric motor mechanism of the rotating armature type in which the case or housing of the motor revolves.

According to the present invention I construct the casing and so mount it upon the motor bearings that it can be employed as a pulley for belt driving purposes, the invention being particularly useful for driving the belts of conveyers, such for example as that described in the specification of my United States Patent No. 1,239,400 dated Sept. 4, 1917.

An important feature of the invention is that I provide variable speed mechanism within the pulley or housing and furnish it with a clutch whereby the travel of the belt, conveyer, band or the like can be varied for the purpose of carrying material of different weights.

As above stated the invention is particularly applicable to conveyers for use on ships and I will describe it more particularly with reference thereto.

In the accompanying drawings,

Figure 1 illustrates one form of the invention, the drawing being a vertical section.

Fig. 2 is an end elevation about the line 2—2 of Fig. 1 part of the framework being omitted and, Fig. 3 shows the invention as applied to a conveyer of the type described in the specification No. 1,239,400 above referred to.

Referring more particularly to Fig. 1, the fixed shaft $a$ is mounted in the frame $b$ of the conveyer, such for example as that shown in Fig. 3. This shaft is provided at one end with a collar which carries roller bearings $c$ and toward its other end with a sleeve 1 carrying similar bearings 8, which will be referred to hereinafter. These bearings support the pulley-housing $d$ hereinafter called the pulley. Within the pulley a stationary frame $f$ is fixed to the shaft $a$, by keying or other suitable means and carries the field magnets $h$, which with the frame and shaft are non-rotating. A sleeve $i$ is fitted over the shaft $a$ and is fixed to the armature $j$ which rotates within the field magnets $h$. It will be observed that the sleeve $i$ extends part way only along that shaft $a$ and that a second sleeve 1 is placed over the greater portion of the rest of the shaft.

Between the frame $f$ and the end of the housing I fit a spur-wheel 2 in mesh with teeth 3 on the sleeve $i$ of the motor. The wheel 2 is rigid with a smaller wheel 4 meshing at 5 with a wheel 6 fixed to the shaft 1. A disk wheel 7 mounted on bearings 8 is arranged opposite a sleeve 9, and between these two parts a sliding dog-clutch 10 is fitted and is adapted at 11 and 12 to engage respectively the sleeve 9 or the disk 7. Outside the housing is a bearing 13 keyed at 14 to the shaft $a$. This bearing supports a sliding pin 15 which carries a semi-circular plate 16 engaging the recess 17 in the clutch member 10. Over this pin 15 a sleeve 18 is fitted and is provided with a helically set groove 19 into which a pin 20 on the shaft 15 fits, the said sleeve having a short handle or lever 21, all these parts being arranged within the side 22 of the conveyer-frame. At the end of the pulley $d$ a wheel 24 with inside teeth is fitted and is in mesh with a pinion 25 carried by bolt 26, through the medium of an intermediate pinion 25' carried by bolt 26'.

Assuming the motor to be working, the sleeve $i$ will rotate and teeth 3 will drive pinion 2 and with it pinion 4 and thus the wheel 6 which carries around the sleeve 1 and the clutch 10 thereon.

As shown in the drawings, the clutch 10 is at 12 in engagement with the disk wheel 7 and thus drives the pulley $d$ in accordance with the ratio of the wheels.

To vary the speed, the hand lever 21 is turned through an angle of 180° thus drawing the shaft 15 to the left side as viewed in Fig. 1. This will bring about its disengagement at 12 and engagement at 11 between the clutch and the sleeve 9, which through the wheels 25' and 25 will drive wheel 24 and thus rotate the drum at a slower speed. To return to the original speed it is only necessary to push the hand lever 21 back to the position shown in Fig. 1.

It will be evident that modifications of the speed gear between the motor and the drum can be made, and while it is advantageous to have the variable speed, it must be understood that I may construct one speed only if such be sufficient for my purpose.

What I claim and desire to secure by Letters Patent is:—

1. In combination, an electric motor having field magnets and a rotatable armature, a sleeve upon which said armature is secured, a shaft passing through said sleeve, frames secured to said shaft and carrying the field magnets, a second sleeve carried on said shaft, a clutch on the second sleeve, a surrounding drum having a part adapted to coöperate with said clutch, gearing adapted to transmit motion from the armature to said second sleeve, and means for actuating said clutch to drive said drum.

2. In combination, an electric motor having field magnets and a rotatable armature, a sleeve upon which said armature is secured and provided with a pinion, a shaft passing through said sleeve, frames secured to said shaft and carrying the field magnets, a second sleeve carried on said shaft, a clutch slidably carried on the second sleeve, a surrounding drum having a part adapted to coöperate with said clutch, a second shaft carried by one of the frames, gearing comprising two spur wheels keyed to the last-mentioned shaft, one of said spur wheels gearing with the pinion fixed on the armature sleeve, a gear carried by the second sleeve and meshing with the other spur wheel, and means for engaging the clutch with one of the disks to drive a drum.

3. In combination, an electric motor having field magnets and a rotatable armature, a sleeve upon which said armature is secured and provided with a pinion, a shaft passing through said sleeve, frames secured to said shaft and carrying the field magnets, a second sleeve carried on said shaft, a clutch feather-keyed on the second sleeve, a surrounding drum having a part adapted to coöperate with said clutch, a second shaft carried by one of the frames, gearing comprising two spur wheels keyed to the last-mentioned shaft, one of said spur wheels gearing with the pinion fixed on the armature sleeve, a gear carried by the second sleeve and meshing with the other spur wheel; means, including a pinion and two spur wheels, for varying the speed of rotation of the aforesaid casing, said last mentioned pinion being adapted to coöperate with said clutch, and means for engaging the clutch either with said last mentioned pinion or with said coöperating part carried by the drum.

In witness whereof I have hereunto set my hand in presence of two witnesses.

GEORGE JONES.

Witnesses:
　ELIZABETH PARRY,
　BARBARA BROOM.